(12) United States Patent
Dahlke et al.

(10) Patent No.: US 11,155,661 B2
(45) Date of Patent: Oct. 26, 2021

(54) METHOD OF MAKING A COPOLYMER OF TETRAFLUOROETHYLENE HAVING SULFONYL PENDANT GROUPS

(71) Applicant: 3M INNOVATIVE PROPERTIES COMPANY, St. Paul, MN (US)

(72) Inventors: Gregg D. Dahlke, St. Paul, MN (US); Denis Duchesne, Woodbury, MN (US); Klaus Hintzer, Kastl (DE); Markus E. Hirschberg, Burgkirchen (DE); Kai H. Lochhaas, Neuötting (DE); Arne Thaler, Emmerting (DE); Tilman C. Zipplies, Burghausen (DE)

(73) Assignee: 3M Innovative Properties Company, St. Paul, MN (US)

( * ) Notice: Subject to any disclaimer, the term of this patent is extended or adjusted under 35 U.S.C. 154(b) by 124 days.

(21) Appl. No.: 15/762,267

(22) PCT Filed: Sep. 22, 2016

(86) PCT No.: PCT/US2016/053104
§ 371 (c)(1),
(2) Date: Mar. 22, 2018

(87) PCT Pub. No.: WO2017/053563
PCT Pub. Date: Mar. 30, 2017

(65) Prior Publication Data
US 2018/0273663 A1 Sep. 27, 2018

Related U.S. Application Data

(60) Provisional application No. 62/222,296, filed on Sep. 23, 2015.

(51) Int. Cl.
| | |
|---|---|
| *C08F 214/26* | (2006.01) |
| *C08F 8/22* | (2006.01) |
| *H01M 8/1039* | (2016.01) |
| *C09D 127/24* | (2006.01) |
| *C09D 127/18* | (2006.01) |
| *H01M 4/86* | (2006.01) |
| *H01M 8/1004* | (2016.01) |
| *H01M 8/1018* | (2016.01) |

(52) U.S. Cl.
CPC ............ *C08F 214/262* (2013.01); *C08F 8/22* (2013.01); *C09D 127/18* (2013.01); *C09D 127/24* (2013.01); *H01M 4/8668* (2013.01); *H01M 8/1004* (2013.01); *H01M 8/1039* (2013.01); *H01M 2008/1095* (2013.01); *H01M 2300/0082* (2013.01); *Y02P 70/50* (2015.11)

(58) Field of Classification Search
None
See application file for complete search history.

(56) References Cited

U.S. PATENT DOCUMENTS

| | | | |
|---|---|---|---|
| 2,559,752 A | 7/1951 | Berry | |
| 3,282,875 A | 11/1966 | Connolly | |
| 3,560,568 A * | 2/1971 | Resnick | ............... C07C 309/00 |
| | | | 562/111 |
| 3,718,627 A | 2/1973 | Grot | |
| 4,267,364 A | 5/1981 | Grot | |
| 4,349,650 A | 9/1982 | Krespan | |
| 4,358,412 A | 11/1982 | Ezzell | |
| 4,423,197 A | 12/1983 | Behr | |
| 4,470,889 A | 9/1984 | Ezzell | |
| 4,621,116 A | 11/1986 | Morgan | |
| 4,962,282 A | 10/1990 | Marraccini | |
| 5,182,342 A | 1/1993 | Feiring | |
| 5,285,002 A | 2/1994 | Grootaert | |
| 5,378,782 A | 1/1995 | Grootaert | |
| 5,442,097 A | 8/1995 | Obermeier | |

(Continued)

FOREIGN PATENT DOCUMENTS

| | | |
|---|---|---|
| GB | 1286859 | 8/1972 |
| JP | 62288614 A * | 12/1987 |

(Continued)

OTHER PUBLICATIONS

Gronwald, "Synthesis of difluoroethyl perfluorosulfonate monomer and its application", Journal of Fluorine Chemistry, Jun. 2008, vol. 129, No. 6, pp. 535-540.
Scheirs, Modern Fluoropolymers, 241 (1997).
Uematsu, "Synthesis of novel perfluorosulfonamide monomers and their application"; Journal of Fluorine Chemistry, 2006, vol. 127, pp. 1087-1095.
International Search Report for PCT International Application No. PCT/US2016/053104, dated Nov. 17, 2016, 5 pages.

*Primary Examiner* — Nicole M. Buie-Hatcher
(74) *Attorney, Agent, or Firm* — Kathleen B. Gross

(57) ABSTRACT

A method of making a copolymer is disclosed. The method includes copolymerizing components including tetrafluoroethylene and a compound represented by formula $CF_2=CF-O-(CF_2)_a-SO_2X$, wherein "a" is a number from 1 to 4, and X is $-NZH$, $-NZ-SO_2-(CF_2)_{1-6}-SO_2X'$, or $-OZ$, wherein Z is independently a hydrogen, an alkali metal cation, or a quaternary ammonium cation, and wherein X' is independently $-NZH$ or $-OZ$. The components include at least 60 mole % of tetrafluoroethylene based on the total amount of components. A copolymer prepared by the method is also provided. A method of making a membrane using the copolymer is also provided. The present disclosure also provides a polymer electrolyte membrane that includes a copolymer made by the method and a membrane electrode assembly that includes such a polymer electrolyte membrane.

17 Claims, No Drawings

(56) References Cited

U.S. PATENT DOCUMENTS

| | | | |
|---|---|---|---|
| 5,463,021 A | 10/1995 | Beyer | |
| 6,150,426 A * | 11/2000 | Curtin | C08J 3/16 |
| | | | 521/28 |
| 6,255,536 B1 | 7/2001 | Worm | |
| 6,274,677 B1 | 8/2001 | Tatemoto | |
| 6,294,627 B1 | 9/2001 | Worm | |
| 6,387,570 B1 | 5/2002 | Nakamura | |
| 6,388,139 B1 | 5/2002 | Resnick | |
| 6,429,258 B1 | 8/2002 | Morgan | |
| 6,613,941 B1 | 9/2003 | Felix | |
| 6,624,328 B1 | 9/2003 | Guerra | |
| 6,706,193 B1 | 3/2004 | Burkard | |
| 6,780,544 B2 | 8/2004 | Noh | |
| 6,794,550 B2 | 9/2004 | Hintzer | |
| 7,018,541 B2 | 3/2006 | Hintzer | |
| 7,071,271 B2 | 7/2006 | Thaler | |
| 7,214,740 B2 | 5/2007 | Lochhaas | |
| 7,265,162 B2 | 9/2007 | Yandrasits | |
| 7,304,101 B2 * | 12/2007 | Hintzer | C08F 214/18 |
| | | | 523/310 |
| 7,572,534 B2 | 8/2009 | Frey | |
| 7,671,112 B2 | 3/2010 | Hintzer | |
| 8,208,962 B2 | 6/2012 | Thomas | |
| 8,367,267 B2 | 2/2013 | Frey | |
| 8,628,871 B2 | 1/2014 | Frey | |
| 10,676,555 B2 | 6/2020 | Duschesne | |
| 10,717,795 B2 | 7/2020 | Duschesne | |
| 2002/0160272 A1 | 10/2002 | Tanaka | |
| 2003/0023015 A1 * | 1/2003 | Tatemoto | C08F 6/003 |
| | | | 526/243 |
| 2004/0107869 A1 | 6/2004 | Velamakanni | |
| 2005/0037265 A1 | 2/2005 | Watakabe | |
| 2005/0096442 A1 * | 5/2005 | Thaler | C08F 214/18 |
| | | | 526/255 |
| 2006/0014887 A1 * | 1/2006 | Hamrock | C08J 5/2237 |
| | | | 524/544 |
| 2006/0063055 A1 | 3/2006 | Frey | |
| 2006/0199898 A1 | 9/2006 | Funaki | |
| 2006/0223924 A1 | 10/2006 | Tsuda | |
| 2006/0281946 A1 | 12/2006 | Morita | |
| 2007/0015865 A1 | 1/2007 | Hintzer | |
| 2007/0060699 A1 | 3/2007 | Tsuda | |
| 2007/0117915 A1 | 5/2007 | Funaki | |
| 2007/0129500 A1 | 6/2007 | Honda | |
| 2007/0142513 A1 | 6/2007 | Tsuda | |
| 2007/0142541 A1 | 6/2007 | Hintzer | |
| 2010/0311906 A1 | 12/2010 | Lavallee | |
| 2011/0303868 A1 | 12/2011 | Sienkiewicz | |
| 2014/0141357 A1 * | 5/2014 | Lochhaas | H01M 8/1051 |
| | | | 429/482 |
| 2017/0081447 A1 * | 3/2017 | Dossi | C08F 214/222 |
| 2018/0057625 A1 * | 3/2018 | Hintzer | C08F 214/26 |
| 2019/0027769 A1 | 1/2019 | Dahlke | |

FOREIGN PATENT DOCUMENTS

| | | | |
|---|---|---|---|
| JP | 2004010562 | 1/2004 | |
| JP | 2010018674 | 1/2010 | |
| JP | 2011040363 | 2/2011 | |
| JP | 2011174032 | 9/2011 | |
| JP | 5287245 B2 | 9/2013 | |
| JP | 2013181128 | 9/2013 | |
| JP | 5682153 B2 | 3/2015 | |
| WO | WO-03050150 A1 * | 6/2003 | H01M 8/1023 |
| WO | WO 2008001894 | 1/2008 | |

* cited by examiner

METHOD OF MAKING A COPOLYMER OF TETRAFLUOROETHYLENE HAVING SULFONYL PENDANT GROUPS

CROSS-REFERENCE TO RELATED APPLICATION

This application is a national stage filing under 35 U.S.C. 371 of PCT/US2016/053104, filed Sep. 22, 2016, which claims priority to U.S. Provisional Application No. 62/222, 296, filed Sep. 23, 2015, the disclosure of which is incorporated by reference in its entirety herein.

BACKGROUND

Copolymers of tetrafluoroethylene and monomers including sulfonyl fluoride pendant groups have been made. See, for example, U.S. Pat. Nos. 3,282,875 (Connolly), 3,718, 627 (Grot), and 4,267,364 (Grot). Hydrolysis of the sulfonyl fluoride to form an acid or acid salt provides ionic copolymers.

JP2011174032, published Sep. 8, 2011, reports a radical polymerization of a fluorine-containing monomer and a comonomer having a —$SO_3Li$ group.

SUMMARY

While ionomers made from short-chain $SO_2F$-containing vinyl ethers (e.g., $CF_2$=CF—O—$(CF_2)_a$—$SO_2F$ in which a is 1 to 4) and other fluorinated monomers are desirable, processes for making these ionomers provide several challenges. First, short-chain $SO_2F$-containing vinyl ether monomers are difficult to prepare due to undesired side reactions. For example, decarboxylation of compounds represented by formula $CF_3C(COF)(F)$—O—$(CF_2)_a$—$SO_2F$ are known to form cyclic sulfones, particularly when a is 2 or 3 (see, e.g., U.S. Pat. No. 4,358,412 (Ezzell et al. and references cited therein). Also, such ionomers are made by solvent polymerization in fluorinated solvents or aqueous emulsion polymerization with fluorinated emulsifiers. For some applications, such as fuel cell applications, the —$SO_2F$ groups are subsequently hydrolyzed to —$SO_3H$ groups. This multi-step process can be time-consuming and costly. It is reported in U.S. Pat. No. 4,358,412 (Ezzell et al.) that only polymers having —$SO_2F$ groups (not in the sulfonic acid or acid salt form) are thermoplastic and can be formed into films. Also, U.S. Pat. No. 7,071,271 (Thaler et al.) teaches that conversion of a —$SO_2F$ to a sulfonic acid salt during polymerization should be avoided. Thus, it is taught in the art that polymerization with $SO_2F$-containing vinyl ethers followed by hydrolysis of the polymers is necessary for making ionomers. The present disclosure provides a more expedient method for making ionomers and ionomers made from this method. Using the method according to the present disclosure, at least a step of hydrolyzing the copolymer following polymerization may be avoided.

In one aspect, the present disclosure provides a method of making a copolymer. The method includes copolymerizing components including tetrafluoroethylene and at least one compound represented by formula $CF_2$=CF—O—$(CF_2)_a$—$SO_2X$, wherein "a" is a number from 1 to 4, and X is —NZH, —NZ—$SO_2$—$(CF_2)_{1-6}$—$SO_2X'$, or —OZ, wherein Z is independently a hydrogen, an alkali metal cation, or a quaternary ammonium cation, and wherein X' is —NZH or OZ. The components include at least 60 mole % of tetrafluoroethylene based on the total amount of components.

In another aspect, the present disclosure provides a copolymer prepared by the method described above. As polymerized, the copolymer can have up to 400 —COOM and —COF end groups per $10^6$ carbon atoms, wherein M is independently an alkyl group, a hydrogen atom, a metallic cation, or a quaternary ammonium cation.

In another aspect, the present disclosure provides a method of making a membrane using the copolymer made by the method described herein.

In another aspect, the present disclosure provides a method of making a catalyst ink using the copolymer made by the method described herein.

In another aspect, the present disclosure provides a method of making a binder for an electrochemical system using the copolymer made by the method described herein.

In another aspect, the present disclosure provides a polymer electrolyte membrane that includes a copolymer made by the method described herein.

In another aspect, the present disclosure provides a catalyst ink that includes a copolymer made by the method described herein.

In another aspect, the present disclosure provides a membrane electrode assembly that includes such a polymer electrolyte membrane or catalyst ink.

In another aspect, the present disclosure provides a binder for an electrochemical system that includes a copolymer made by the method described herein.

In another aspect, the present disclosure provides a battery that includes such a binder.

In this application:

Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

The terms "perfluoro" and "perfluorinated" refer to groups in which all C—H bonds are replaced by C—F bonds.

The phrase "interrupted by at least one —O-group", for example, with regard to a perfluoroalkyl or perfluoroalkylene group refers to having part of the perfluoroalkyl or perfluoroalkylene on both sides of the —O-group. For example, —$CF_2CF_2$—O—$CF_2$—$CF_2$— is a perfluoroalkylene group interrupted by an —O—.

All numerical ranges are inclusive of their endpoints and nonintegral values between the endpoints unless otherwise stated (e.g., 1 to 5 includes 1, 1.5, 2, 2.75, 3, 3.80, 4, 5, etc.).

DETAILED DESCRIPTION

The method according to the present disclosure includes copolymerizing components including at least one compound represented by formula $CF_2$=CF—O—$(CF_2)_a$—$SO_2X$. In this formula "a" is a number from 1 to 4 or 2 to 4. In some embodiments, "a" is 2. Also in this formula, X is —NZH, —NZ—$SO_2$—$(CF_2)_{1-6}$—$SO_2X'$, or OZ; X' is —NZH or —OZ; and Z is a hydrogen, an alkali metal cation, or a quaternary ammonium cation. The quaternary ammonium cation can be substituted with any combination of hydrogen and alkyl groups, in some embodiments, alkyl groups independently having from one to four carbon atoms. In some embodiments, Z is an alkali-metal cation. In some embodiments, Z is a sodium or lithium cation. In some embodiments, Z is a sodium cation. In some embodiments, X is $NH_2$. In some embodiments, X' is $NH_2$. In some embodiments, the compound represented by formula $CF_2=CF-O-(CF_2)_a-SO_2X$ is $CF_2=CF-O-CF_2CF_2-SO_3Na$.

Compounds represented by formula $CF_2=CF-O-(CF_2)_a-SO_2X$ (e.g., compounds represented by formula $[CF_2=CF-O-(CF_2)_2-SO_3]M$, where M is an alkali metal, and $CF_2=CF-O-(CF_2)_2-SO_2NZH$) can be made by known methods. Conveniently, a compound of formula $[CF_2=CF-O-(CF_2)_2-SO_3]M$ can be prepared in three steps from the known compound represented by formula $FC(O)-CF(CF_3)-O-(CF_2)_2-SO_2F$. As reported in Gronwald, O., et al; "Synthesis of difluoroethyl perfluorosulfonate monomer and its application"; *J. Fluorine Chem.*, 2008, 129, 535-540, the acid fluoride can be combined with a methanol solution of sodium hydroxide to form the disodium salt, which can be dried and heated in dry diglyme to effect the carboxylation. $FC(O)-CF(CF_3)-O-(CF_2)_2-SO_2F$ can be prepared by ring-opening and derivatization of tetrafluoroethane-β-sultone as described in U.S. Pat. No. 4,962,292 (Marraccini et al.). Compounds represented by formula $CF_2=CF-O-(CF_2)_a-SO_2X$ can also be prepared by hydrolyzing the products from the elimination of halogen from a compound of formula $CF_2Cl-CFCl-O-(CF_2)_2-SO_2F$ described in U.S. Pat. No. 6,388,139 (Resnick) and or hydrolyzing the products of decarboxylation of $FSO_2-(CF_2)_{(3-4)}-O-CF(CF_3)-COO^-)_pM^{+p}$ described in U.S. Pat. No. 6,624,328 (Guerra). Compounds of formula $CF_2=CF-O-(CF_2)_2-SO_2NH_2$ can be prepared, for example, by reaction of a cyclic sulfone with one equivalent of LHMDS as described by Uematsu, N., et al. "Synthesis of novel perfluorosulfonamide monomers and their application"; *J. Fluorine Chem.*, 2006, 127, 1087-1095. Compounds of formula $CF_2=CF-O-(CF_2)_a-SO_2NH_2$ can be reacted with multi-functional sulfonyl fluoride or sulfonyl chloride compounds to provide compounds of formula $CF_2=CF-O-(CF_2)_a-SO_2NHSO_2-(CF_2)_{1-6}-SO_2X'$ after hydrolysis. Examples of useful multi-functional compounds include 1,1,2,2-tetrafluoroethyl-1,3-disulfonyl fluoride; 1,1,2,2,3,3-hexafluoropropyl-1,3-disulfonyl fluoride; 1,1,2,2,3,3,4,4-octafluorobutyl-1,4-disulfonyl fluoride; 1,1,2,2,3,3,4,4,5,5-perfluorobutyl-1,5-disulfonyl fluoride; 1,1,2,2-tetrafluoroethyl-1,2-disulfonyl chloride; 1,1,2,2,3,3-hexafluoropropyl-1,3-disulfonyl chloride; 1,1,2,2,3,3,4,4-octafluorobutyl-1,4-disulfonyl chloride; and 1,1,2,2,3,3,4,4,5,5-perfluorobutyl-1,5-disulfonyl chloride. If desired, compounds of formula $CF_2=CF-O-(CF_2)_a-SO_2NH_2$ can be treated with compounds of formula $FSO_2(CF_2)_{1-6}SO_3H$, which can be made by hydrolyzing any of the multi-functional sulfonyl fluorides or sulfonyl chlorides described above with one equivalent of water in the presence of base (e.g., N,N-diisopropylethylamine (DIPEA)) as described in JP 2011-40363, published Feb. 24, 2011. This reaction can directly provide compounds of formula $CF_2=CF-O-(CF_2)_a-SO_2NHSO_2-(CF_2)_{1-6}-SO_2Z$. Further details about the preparation of the compounds represented by formula $CF_2=CF-O-(CF_2)_a-SO_2X$ can be found in the examples, below.

The components that are copolymerized in the method according to the present disclosure comprise up to 40 mole % of at least one compound represented by formula $CF_2=CF-O-(CF_2)_a-SO_2X$, in any of its embodiments described above, based on the total amount of components. In some embodiments, the components comprise up to 35, 30, 25, or 20 mole % of a compound represented by formula $CF_2=CF-O-(CF_2)_a-SO_2X$ based on the total amount of components.

The components to be polymerized in the method according to the present disclosure can include more than one compound represented by formula $CF_2=CF-O-(CF_2)_a-SO_2X$. When more than one compound represented by formula $CF_2=CF-O-(CF_2)_a-SO_2X$ is present, each of "a", X, X', and Z may be independently selected. In some embodiments, the components include compounds represented by formula $CF_2=CF-O-(CF_2)_a-SO_3Z$ and $CF_2=CF-O-(CF_2)_a-SO_2NZH$ or $CF_2=CF-O-(CF_2)_a-SO_2-NZ-SO_2-(CF_2)_{1-6}-SO_2X'$, wherein each "a" is independently selected and X' is as defined above. The ratio between $SO_3Z$ and $SO_2NZH-$ or $SO_2-NZ-SO_2$-containing components may range from 99:1 to 1:99. In these embodiments, each Z is independently hydrogen, an alkali-metal cation, or a quaternary ammonium cation. In some of these embodiments, each Z is independently an alkali-metal cation or a quaternary ammonium cation.

It should be understood that compounds represented by formula $CF_2=CF-O-(CF_2)_a-SO_2X$ in the method according to the present disclosure are not prepared in situ from compounds represented by formula $CF_2=CF-O-(CF_2)_a-SO_2F$. In some embodiments, the components to be polymerized in the method disclosed herein are substantially free of compounds represented by formula $CF_2=CF-O-(CF_2)_a-SO_2F$. In this regard, "substantially free of compounds represented by formula $CF_2=CF-O-(CF_2)_a-SO_2F$" may mean that the components be polymerized in the method disclosed herein are free of compounds represented by formula $CF_2=CF-O-(CF_2)_a-SO_2F$ or that such compounds are present in an amount of up to 5, 4, 3, 2, 1, 0.5, 0.1. 0.05, or 0.01 mole percent, based on the total amount of components.

The components that are copolymerized in the method according to the present disclosure comprise at least 60 mole % of tetrafluoroethylene based on the total amount of components. In some embodiments, the components comprise at least 65, 70, 75, 80, or 90 mole % of tetrafluoroethylene based on the total amount of components. In some embodiments, the components to be polymerized in the method disclosed herein consist of tetrafluoroethylene and a compound represented by formula $CF_2=CF-O-(CF_2)_a-SO_2X$, in any of its embodiments described above.

In some embodiments, the components to be polymerized in the method disclosed herein further comprise at least one fluorinated olefin independently represented by formula $C(R)_2=CF-Rf$, where Rf is fluorine or a perfluoroalkyl having from 1 to 8, in some embodiments 1 to 3, carbon atoms, and each R is independently hydrogen, fluorine, or chlorine. Some examples of fluorinated olefins useful as components of the polymerization include, hexafluoropropylene (HFP), trifluorochloroethylene (CTFE), and partially fluorinated olefins (e.g., vinylidene fluoride (VDF), tetrafluoropropylene (R1234yf), pentafluoropropylene, and trifluoroethylene). Fluorinated olefins may be present in the components to be polymerized in any useful amount, in some embodiments, in an amount of up to 10, 7.5, or 5 mole percent, based on the total amount of polymerizable components.

In some embodiments, the components to be copolymerized are essentially free of VDF. For example, at a pH higher than 8, VDF may undergo dehydrofluorination, and it may be useful to exclude VDF from the components to be polymerized. "Essentially free of VDF" can be that VDF is present in the components to be polymerized at less than 1

(in some embodiments, less than 0.5, 0.1, 0.05, or 0.01) mole percent. "Essentially free of VDF" includes being free of VDF.

Further examples of suitable monomers that may be included in the components to be polymerized include perfluorovinyl ethers (e.g., perfluoroalkyl vinyl ethers (PAVE)) and perfluoroalkoxyalkyl vinyl ethers (PAOVE). Any combination of a perfluoroalkyl vinyl ether, a perfluoroalkoxalkyl vinyl ether; and at least one fluoroolefin independently represented by formula $CR_2=CF-Rf$ may be useful components to be polymerized.

Perfluoroalkyl vinyl ethers suitable for the components to be polymerized in the method disclosed herein include those represented by formula $CF_2=CFORf_1$, wherein $Rf_1$ is a perfluoroalkyl group having from 1 to 6, 1 to 5, 1 to 4, or 1 to 3 carbon atoms. Examples of useful perfluoroalkyl vinyl ethers include perfluoromethyl vinyl ether ($CF_2=CFOCF_3$), perfluoroethyl vinyl ether ($CF_2=CFOCF_2CF_3$), and perfluoropropyl vinyl ether ($CF_2=CFOCF_2CF_2CF_3$).

Perfluoroalkoxyalkyl vinyl ethers suitable for the components to be polymerized in the method disclosed herein include those represented by formula $CF_2=CF(OC_nF_{2n})_zORf_2$, in which each n is independently from 1 to 6, z is 1 or 2, and $Rf_2$ is a linear or branched perfluoroalkyl group having from 1 to 8 carbon atoms and optionally interrupted by one or more —O— groups. In some embodiments, n is from 1 to 4, or from 1 to 3, or from 2 to 3, or from 2 to 4. In some embodiments, n is 1 or 3. In some embodiments, n is 3. $C_nF_{2n}$ may be linear or branched. In some embodiments, $C_nF_{2n}$ can be written as $(CF_2)_n$, which refers to a linear perfluoroalkylene group. In some embodiments, $C_nF_{2n}$ is $-CF_2-CF_2-CF_2-$. In some embodiments, $C_nF_{2n}$ is branched, for example, $-CF_2-CF(CF_3)-$. In some embodiments, $(OC_nF_{2n})_n$ is represented by $-O-(CF_2)_{1-4}-[O(CF_2)_{1-4}]_{0-1}$. In some embodiments, $Rf_2$ is a linear or branched perfluoroalkyl group having from 1 to 8 (or 1 to 6) carbon atoms that is optionally interrupted by up to 4, 3, or 2 —O-groups. In some embodiments, $Rf_2$ is a perfluoroalkyl group having from 1 to 4 carbon atoms optionally interrupted by one —O-group. Examples of suitable perfluoroalkoxyalkyl vinyl ethers include $CF_2=CFOCF_2OCF_3$, $CF_2=CFOCF_2OCF_2CF_3$, $CF_2=CFOCF_2CF_2OCF_3$, $CF_2=CFOCF_2CF_2CF_2OCF_3$, $CF_2=CFOCF_2CF_2CF_2CF_2OCF_3$, $CF_2=CFOCF_2CF_2OCF_2CF_3$, $CF_2=CFOCF_2CF_2OCF_2CF_2CF_3$, $CF_2=CFOCF_2CF_2CF_2OCF_2CF_3$, $CF_2=CFOCF_2CF_2OCF_2OCF_3$, $CF_2=CFOCF_2CF_2OCF_2CF_2OCF_3$, $CF_2=CFOCF_2CF_2OCF_2CF_2CF_2OCF_3$, $CF_2=CFOCF_2CF_2OCF_2CF_2CF_2CF_2OCF_3$, $CF_2=CFOCF_2CF_2(OCF_2)_3OCF_3$, $CF_2=CFOCF_2CF_2(OCF_2)_4OCF_3$, $CF_2=CFOCF_2CF_2OCF_2OCF_2OCF_3$, $CF_2=CFOCF_2CF_2OCF_2CF_2CF_3$ $CF_2=CFOCF_2CF_2OCF_2OCF_2CF_2CF_3$, $CF_2=CFOCF_2CF(CF_3)-O-C_3F_7$ (PPVE-2), $CF_2=CF(OCF_2CF(CF_3))_2-O-C_3F_7$ (PPVE-3), and $CF_2=CF(OCF_2CF(CF_3))_3-O-C_3F_7$ (PPVE-4). Many of these perfluoroalkoxyalkyl vinyl ethers can be prepared according to the methods described in U.S. Pat. Nos. 6,255,536 (Worm et al.) and 6,294,627 (Worm et al.).

Perfluoroalkyl allyl ethers and perfluoroalkoxyalkyl allyl ethers may also be useful components to be polymerized in the method according to the present disclosure. Suitable perfluoroalkoxyalkyl allyl ethers include those represented by formula $CF_2=CFCF_2(OC_nF_{2n})_zORf_2$, in which n, z, and $Rf_2$ are as defined above in any of the embodiments of perfluoroalkoxyalkyl vinyl ethers. Examples of suitable perfluoroalkoxyalkyl allyl ethers include $CF_2=CFCF_2OCF_2CF_2OCF_3$, $CF_2=CFCF_2OCF_2CF_2CF_2OCF_3$, $CF_2=CFCF_2OCF_2OCF_3$, $CF_2=CFCF_2OCF_2OCF_2CF_3$, $CF_2=CFCF_2OCF_2CF_2CF_2CF_2OCF_3$, $CF_2=CFCF_2OCF_2CF_2OCF_2CF_3$, $CF_2=CFCF_2OCF_2CF_2CF_2OCF_2CF_3$, $CF_2=CFCF_2OCF_2CF_2CF_2CF_2OCF_2CF_3$, $CF_2=CFCF_2OCF_2CF_2OCF_2OCF_3$, $CF_2=CFCF_2OCF_2CF_2OCF_2CF_2OCF_3$, $CF_2=CFCF_2OCF_2CF_2OCF_2CF_2CF_2OCF_3$, $CF_2=CFCF_2OCF_2CF_2OCF_2CF_2CF_2CF_2OCF_3$, $CF_2=CFCF_2OCF_2CF_2(OCF_2)_3OCF_3$, $CF_2=CFCF_2OCF_2CF_2(OCF_2)_4OCF_3$, $CF_2=CFCF_2OCF_2CF_2OCF_2OCF_2OCF_3$, $CF_2=CFCF_2OCF_2CF_2OCF_2CF_2CF_3$, $CF_2=CFCF_2OCF_2CF_2OCF_2OCF_2CF_2CF_3$, $CF_2=CFCF_2OCF_2CF(CF_3)-O-C_3F_7$, and $CF_2=CFCF_2(OCF_2CF(CF_3))_2-O-C_3F_7$. Many of these perfluoroalkoxyalkyl allyl ethers can be prepared, for example, according to the methods described in U.S. Pat. No. 4,349, 650 (Krespan).

The vinyl ethers and allyl ethers described above in any of their embodiments, may be present in the components to be polymerized in any useful amount, in some embodiments, in an amount of up to 10, 7.5, or 5 mole percent, based on the total amount of polymerizable components.

In some embodiments of the method according to the present disclosure, the components further comprise at least one of hexafluoropropylene, perfluoromethyl vinyl ether, perfluoropropyl vinyl ether, perfluoro-3-methoxy-n-propyl vinyl ether, or tetrafluoropropene, The components to be polymerized in the method according to the present disclosure can also include perfluorinated or partially fluorinated bisolefins, which may be represented by formula $X_2C=CY-(CZ_2)_m-(O)_n-R_F-(O)_o-(CZ_2)_p-CY=CX_2$. In this formula, each of X, Y, and Z is independently fluoro, hydrogen, alkyl, alkoxy, polyoxyalkyl, perfluoroalkyl, perfluoroalkoxy or perfluoropolyoxyalkyl, m and p are independently an integer from 0 to 15, and n, o are independently 0 or 1. In some embodiments, X, Y, and Z are each independently fluoro, $CF_3$, $C_2F_5$, $C_3F_7$, $C_4F_9$, hydrogen, $CH_3$, $C_2H_5$, $C_3H_7$, $C_4H_9$. In some embodiments, X, Y, and Z are each fluoro (e.g., as in $CF_2=CF-O-R_F-O-CF=CF_2$ and $CF_2=CF-CF_2-O-R_F-O-CF_2-CF=CF_2$). In some embodiments, n and o are 1, and the bisolefins are divinyl ethers, diallyl ethers, or vinyl-allyl ethers. $R_F$ represents linear or branched perfluoroalkylene or perfluoropolyoxyalkylene or arylene, which may be non-fluorinated or fluorinated. In some embodiments, $R_F$ is perfluoroalkylene having from 1 to 12, from 2 to 10, or from 3 to 8 carbon atoms. The arylene may have from 1 to 14, 1 to 12, or 1 to 10 carbon atoms and may be non-substituted or substituted with one or more halogens other than fluoro, perfluoroalkyl (e.g. $-CF_3$ and $-CF_2CF_3$), perfluoroalkoxy (e.g. $-O-CF_3$, $-OCF_2CF_3$), perfluoropolyoxyalkyl (e.g., $-OCF_2OCF_3$; $-CF_2OCF_2OCF_3$), fluorinated, perfluorinated, or non-fluorinated phenyl or phenoxy, which may be substituted with one or more perfluoroalkyl, perfluoroalkoxy, perfluoropolyoxyalkyl groups, one or more halogens other than fluoro, or combinations thereof. In some embodiments, $R_F$ is phenylene or mono-, di-, tri- or tetrafluorophenylene, with the ether groups linked in the ortho, para or meta position. In some embodiments, $R_F$ is $CF_2$; $(CF_2)_q$ wherein q is 2, 3, 4, 5, 6, 7 or 8; $CF_2$—O—$CF_2$; $CF_2$—O—$CF_2$—$CF_2$; $CF(CF_3)$; $(CF_2)_2$—O—$CF(CF_3)$—$CF_2$; $CF(CF_3)$—$CF_2$—O—$CF(CF_3)$; or $(CF_2)_2$—O—$CF(CF_3)$—$CF_2$—O—$CF(CF_3)$—$CF_2$—O—$CF_2$. The bisolefins can introduce long chain branches as described in U.S. Pat. Appl. Pub. No. 2010/0311906 (Lavellee et al.). The bisolefins, described above in any of their embodiments, may be present in the components to be polymerized in any useful amount, in some embodiments, in an amount of up to 2 or 1 mole percent and in an amount of at least 0.1 mole percent, based on the total amount of polymerizable components.

Non-fluorinated monomers may also be useful as components to be polymerized in the method disclosed herein. Examples of suitable non-fluorinated monomers include ethylene, propylene, isobutylene, ethyl vinyl ether, vinyl benzoate, ethyl allyl ether, cyclohexyl allyl ether, norbornadiene, crotonic acid, an alkyl crotonate, acrylic acid, an alkyl acrylate, methacrylic acid, an alkyl methacrylate, and hydroxybutyl vinyl ether. Any combination of these non-fluorinated monomers may be useful. In some embodiments, the components to be polymerized further include acrylic acid or methacrylic acid.

In some embodiments of the method according to the present disclosure or the copolymer made therefrom, the copolymer has an —$SO_2X$ equivalent weight of up to 1000, 900, 800, 750, 700, or 600. In some embodiments, the copolymer has an —$SO_2X$ equivalent weight of at least 400. In general, the —$SO_2X$ equivalent weight of the copolymer refers to the weight of the copolymer containing one mole of —$SO_2X$ groups, wherein X is as defined above in any of its embodiments. In some embodiments, the —$SO_2X$ equivalent weight of the copolymer refers to the weight of the copolymer that will neutralize one equivalent of base. In other words, the —$SO_2X$ equivalent weight of the copolymer refers to the weight of the copolymer containing one mole of sulfonate groups (i.e., —$SO_3^-$). Decreasing the —$SO_2X$ equivalent weight of the copolymer tends to increase electrical conductivity in the copolymer but tends to decrease its crystallinity, which may compromise the mechanical properties of the copolymer. Thus, the —$SO_2X$ equivalent weight may be selected based on a balance of the requirements for the electrical and mechanical properties of the copolymer. In some embodiments, the —$SO_2X$ equivalent weight of the copolymer refers to the weight of the copolymer containing one mole of sulfonamide groups (i.e., —$SO_2NHZ$). Sulfonimide groups (e.g., when X is —$NZSO_2$($CF_2$)$_{1-6}SO_3Z$) also function as acid groups that can neutralize base as described in further detail below. The effective equivalent weight of copolymers including these groups can be much lower than 1000.

In some embodiments, including embodiments in which a lower equivalent weight is desired, the copolymer may be crosslinked to improve, for example, its durability. One useful method of crosslinking is e-beam crosslinking a copolymer that includes chloro, bromo, or iodo groups as described in U.S. Pat. No. 7,265,162 (Yandrasits et al.). Incorporating chloro, bromo, or iodo groups, in some embodiments, bromo or iodo groups, into the copolymer prepared by the method disclosed herein can be carried out by including compounds having formula $CX_2$=$CX(W)$ in the components to be polymerized. In formula $CX_2$=$CX(W)$, each X is independently H or F, and W is I, Br, or $R_f$—W, wherein W is I or Br and $R_f$ is a perfluorinated or partially perfluorinated alkylene group optionally containing O atoms. Examples of useful monomers of formula $CX_2$=$CX(Z)$ include $CF_2$=$CHI$, $CF_2$=$CFI$, $CF_2$=$CFCF_2I$, $CF_2$=$CFCF_2CF_2I$, $CF_2$=$CFOCF_2CF_2I$, $CF_2$=$CFOCF_2CF_2CF_2I$, $CF_2$=$CFOCF_2CF_2CF_2I$, $CF_2$=$CFO(CF_2)_3OCF_2CF_2I$, $CF_2$=$CHBr$, $CF_2$=$CFBr$, $CF_2$=$CFCF_2Br$, $CF_2$=$CFOCF_2CF_2Br$, $CF_2$=$CFCl$, $CF_2$=$CFCF_2Cl$, or a mixture thereof. E-beam crosslinking may be carried out on the copolymer, for example, after it is formed into a membrane as described below.

The method of making the copolymer according to the present disclosure can be carried out by free-radical polymerization. Conveniently, in some embodiments, the method of making the copolymer according to the present disclosure includes radical aqueous emulsion polymerization.

In some embodiments of the method of making the copolymer according to the present disclosure, a water-soluble initiator (e.g., potassium permanganate or a peroxy sulfuric acid salt) can be useful to start the polymerization process. Salts of peroxy sulfuric acid, such as ammonium persulfate or potassium persulfate, can be applied either alone or in the presence of a reducing agent, such as bisulfites or sulfinates (e.g., fluorinated sulfinates disclosed in U.S. Pat. Nos. 5,285,002 and 5,378,782 both to Grootaert) or the sodium salt of hydroxy methane sulfinic acid (sold under the trade designation "RONGALIT", BASF Chemical Company, N.J., USA). The choice of initiator and reducing agent, if present, will affect the end groups of the copolymer. The concentration range for the initiators and reducing agent can vary from 0.01% to 5% by weight based on the aqueous polymerization medium.

In some embodiments, —$SO_2X$ end groups are introduced in the copolymers according to the present disclosure by generating $SO_3^-$ radicals during the polymerization process. When salts of peroxy sulfuric acid are used in the presence of a sulfite or bisulfite salt (e.g., sodium sulfite or potassium sulfite), $SO_3^-$ radicals are generated during the polymerization process, resulting in —$SO_3^-$ end groups. It might be preferred to add metal ions to catalyze or accelerate the formation of —$SO_3^-$ radicals. By altering the stoichiometry of the sulfite or bisulfite salt versus the peroxy sulfuric acid salt, one can vary the amount of —$SO_2X$ end groups.

Most of the initiators described above and any emulsifiers that may be used in the polymerization have an optimum pH-range where they show most efficiency. Also, a pH can be selected for the method according to the present disclosure such that the polymerization is carried out with the salt form of the compound of formula $CF_2$=$CF$—O—$(CF_2)_a$—$SO_2X$, wherein X is an alkali metal cation or an ammonium cation, and to maintain the salt form of the copolymer. For these reason, buffers may be useful. Buffers include phosphate, acetate, or carbonate (e.g., $(NH_4)_2CO_3$ or $NaHCO_3$) buffers or any other acid or base, such as ammonia or alkali-metal hydroxides. In some embodiments, the copolymerizing is carried out at a pH of at least 8, higher than 8, at least 8.5, or at least 9. The concentration range for the initiators and buffers can vary from 0.01% to 5% by weight based on the aqueous polymerization medium. In some embodiments, ammonia is added to the reaction mixture in an amount to adjust the pH to at least 8, higher than 8, at least 8.5, or at least 9.

Typical chain-transfer agents like $H_2$, lower alkanes, alcohols, ethers, esters, and methylene fluoride may be useful in the preparation of the copolymer according to the present disclosure. Termination primarily via chain-transfer results in a polydispersity of about 2 or less. In some embodiments of the method according to the present disclosure, the polymerization is carried out without any chain-transfer agents. A lower polydispersity can sometimes be achieved in the absence of chain-transfer agents. Recombination typically leads to a polydispersity of about 1.5 for small conversions.

Useful polymerization temperatures can range from 20° C. to 150° C. Typically, polymerization is carried out in a temperature range from 40° C. to 120° C., 40° C. to 100° C., or 50° C. to 80° C. The polymerization pressure is usually in the range of 0.8 MPa to 2.5 MPa, 1 MPa to 2.5 MPa, and in some embodiments is in the range from 1.0 MPa to 2.0 MPa. Fluorinated monomers such as HFP can be precharged and fed into the reactor as described, for example, in *Modern Fluoropolymers*, ed. John Scheirs, Wiley & Sons, 1997, p. 241. Perfluoroalkoxyalkyl vinyl ethers represented by formula $CF_2=CF(OC_nF_{2n})_zORf_2$ and perfluoroalkoxyalkyl allyl ethers represented by formula $CF_2=CFCF_2(OC_nF_{2n})_zORf_2$, wherein n, z, and $Rf_2$ are as defined above in any of their embodiments, are typically liquids and may be sprayed into the reactor or added directly, vaporized, or atomized.

Conveniently, in the method of making the copolymer according to the present disclosure, the polymerization process may be conducted with no emulsifier (e.g., no fluorinated emulsifier). Surprisingly, we have found that even with the incorporation of liquid perfluoroalkoxyalkyl vinyl or perfluoroalkoxyalkyl allyl ethers or bisolefins in larger amounts, no fluorinated emulsifier is needed to ensure proper incorporation of these monomers. It can be useful to feed the compound represented by formula $CF_2=CF-O-(CF_2)_a-SO_2X$ and the non-functional comonomers (e.g., perfluoroalkoxyalkyl vinyl or perfluoroalkoxyalkyl allyl ethers or bisolefins) as a homogenous mixture to the polymerization.

In some embodiments, however, perfluorinated or partially fluorinated emulsifiers may be useful. Generally these fluorinated emulsifiers are present in a range from about 0.02% to about 3% by weight with respect to the polymer. Polymer particles produced with a fluorinated emulsifier typically have an average diameter, as determined by dynamic light scattering techniques, in range of about 10 nanometers (nm) to about 300 nm, and in some embodiments in range of about 50 nm to about 200 nm. Examples of suitable emulsifiers include perfluorinated and partially fluorinated emulsifier having the formula $[R_f-O-L-COO^-]_iX^{i+}$ wherein L represents a linear partially or fully fluorinated alkylene group or an aliphatic hydrocarbon group, $R_f$ represents a linear partially or fully fluorinated aliphatic group or a linear partially or fully fluorinated aliphatic group interrupted with one or more oxygen atoms, $X^{i+}$ represents a cation having the valence i and i is 1, 2 or 3. (See, e.g., U.S. Pat. No. 7,671,112 to Hintzer et al.). Additional examples of suitable emulsifiers also include perfluorinated polyether emulsifiers having the formula $CF_3-(OCF_2)_x-O-CF_2X'$, wherein x has a value of 1 to 6 and X' represents a carboxylic acid group or salt thereof, and the formula $CF_3-O-(CF_2)_3-(OCF(CF_3)-CF_2)_y-O-L-Y'$ wherein y has a value of 0, 1, 2 or 3, L represents a divalent linking group selected from $-CF(CF_3)-$, $-CF_2-$, and $-CF_2CF_2-$, and Y' represents a carboxylic acid group or salt thereof (See, e.g., U.S. Pat. Publ. No. 2007/0015865 to Hintzer et al.). Other suitable emulsifiers include perfluorinated polyether emulsifiers having the formula $R_f-O(CF_2CF_2O)CF_2COOA$ wherein $R_f$ is $C_bF_{(2b+1)}$; where b is 1 to 4, A is a hydrogen atom, an alkali metal or $NH_4$, and x is an integer of from 1 to 3. (See, e.g., U.S. Pat. Publ. No. 2006/0199898 to Funaki et al.). Suitable emulsifiers also include perfluorinated emulsifiers having the formula $F(CF_2)_bO(CF_2CF_2O)_xCF_2COOA$ wherein A is a hydrogen atom, an alkali metal or $NH_4$, b is an integer of from 3 to 10, and x is 0 or an integer of from 1 to 3. (See, e.g., U.S. Pat. Publ. No. 2007/0117915 to Funaki et al.). Further suitable emulsifiers include fluorinated polyether emulsifiers as described in U.S. Pat. No. 6,429,258 to Morgan et al. and perfluorinated or partially fluorinated alkoxy acids and salts thereof wherein the perfluoroalkyl component of the perfluoroalkoxy has 4 to 12 carbon atoms, or 7 to 12 carbon atoms. (See, e.g., U.S. Pat. No. 4,621,116 to Morgan). Suitable emulsifiers also include partially fluorinated polyether emulsifiers having the formula $[R_f-(O)_t-CHF-(CF_2)_x-COO-]_iX^{1+}$ wherein $R_f$ represents a partially or fully fluorinated aliphatic group optionally interrupted with one or more oxygen atoms, t is 0 or 1 and x is 0 or 1, $X^{i+}$ represents a cation having a valence i and i is 1, 2 or 3. (See, e.g., U.S. Pat. Publ. No. 2007/0142541 to Hintzer et al.). Further suitable emulsifiers include perfluorinated or partially fluorinated ether-containing emulsifiers as described in U.S. Pat. Publ. Nos. 2006/0223924, 2007/0060699, and 2007/0142513 each to Tsuda et al. and 2006/0281946 to Morita et al. Fluoroalkyl, for example, perfluoroalkyl, carboxylic acids and salts thereof having 6-20 carbon atoms, such as ammonium perfluorooctanoate (APFO) and ammonium perfluorononanoate (see, e.g., U.S. Pat. No. 2,559,752 to Berry) may also be useful. Conveniently, in some embodiments, the method of making the copolymer according to the present disclosure may be conducted in the absence of any of these emulsifiers or any combination thereof.

If fluorinated emulsifiers are used, the emulsifiers can be removed or recycled from the fluoropolymer latex, if desired, as described in U.S. Pat. Nos. 5,442,097 to Obermeier et al., 6,613,941 to Felix et al., 6,794,550 to Hintzer et al., 6,706,193 to Burkard et al., and 7,018,541 to Hintzer et al.

In some embodiments, the obtained copolymer latices are purified by at least one of anion- or cation-exchange processes to remove functional comonomers, anions, and/or cations before coagulation or spray drying (described below). As used herein the term "purify" refers to at least partially removing impurities, regardless of whether the removal is complete. Anionic species that may constitute impurities include, for example, fluoride, anionic residues from surfactants and emulsifiers (e.g., perfluorooctanoate), and residual compounds represented by formula $CF_2=CF-O-(CF_2)_a-SO_2X$. It should be noted, however, that it may be desirable to not remove the ionic fluoropolymer from the dispersion. Useful anion exchange resins typically comprise a polymer (typically crosslinked) that has a plurality of cationic groups (e.g., quaternary alkyl ammonium groups) paired with various anions (e.g., halide or hydroxide). Upon contact with the fluoropolymer dispersion, anionic impurities in the dispersion become associated with the anion exchange resin. After the anion exchange step, the resultant anion-exchanged dispersion is separated from the anion exchange resin, for example, by filtration. It was reported in U.S. Pat. No. 7,304,101 (Hintzer et al.) that the anionic hydrolyzed fluoropolymer does not appreciably become immobilized on the anion exchange resin, which would lead to coagulation and/or material loss. Anionic exchange resins are available commercially from a variety of sources. If the anion exchange resin is not in the hydroxide form it may be at least partially or fully converted to the hydroxide salt form before use. This is typically done by treating the anion exchange resin with an aqueous ammonia or sodium hydroxide solution. Typically, better yields are obtained using gel-type anion-exchange resins than with macroporous anion exchange resins.

Examples of cationic impurities resulting from the above-mentioned polymerization include one or more of, alkali metal cation(s) (e.g., $Li^+$, $Na^+$, $K^+$), ammonium, quaternary alkyl ammonium, alkaline earth cations (e.g., $Mg^{2+}$, $Ca^{2+}$), and Group III metal cations. Useful cation exchange resins include polymers (typically cross-linked) that have a plurality of pendant anionic or acidic groups such as, for example, polysulfonates or polysulfonic acids, polycarboxylates or polycarboxylic acids. Examples of useful sulfonic acid cation exchange resins include sulfonated styrene-divinylbenzene copolymers, sulfonated crosslinked styrene polymers, phenol-formaldehyde-sulfonic acid resins, and benzene-formaldehyde-sulfonic acid resins. Carboxylic acid cation exchange resin is an organic acid, cation exchange resin, such as carboxylic acid cation exchange resin. Cation exchange resins are available commercially from a variety of sources. Cation exchange resins are commonly supplied commercially in either their acid or their sodium form. If the cation exchange resin is not in the acid form (i.e., protonated form) it may be at least partially or fully converted to the acid form in order to avoid the generally undesired introduction of other cations into the dispersion. This conversion to the acid form may be accomplished by means well known in the art, for example by treatment with any adequately strong acid.

If purification of the fluoropolymer dispersion is carried out using both anion and cation exchange processes, the anion exchange resin and cation exchange resin may be used individually or in combination as, for example, in the case of a mixed resin bed having both anion and cation exchange resins.

The obtained polymer dispersion after aqueous emulsion polymerization and optional ion-exchange purification can be used as is or, if higher solids are desired, can be upconcentrated. Typically, if the ionic fluoropolymer dispersion is to be used to form a membrane, the concentration of ionic fluoropolymer is increased to a high level (e.g., at least 20, 30, or 40 percent by weight).

To coagulate the obtained fluoropolymer latex, any coagulant which is commonly used for coagulation of a fluoropolymer latex may be used, and it may, for example, be a water-soluble salt (e.g., calcium chloride, magnesium chloride, aluminum chloride or aluminum nitrate), an acid (e.g., nitric acid, hydrochloric acid or sulfuric acid), or a water-soluble organic liquid (e.g., alcohol or acetone). The amount of the coagulant to be added may be in a range of 0.001 to 20 parts by mass, for example, in a range of 0.01 to 10 parts by mass per 100 parts by mass of the fluoropolymer latex. Alternatively or additionally, the fluoropolymer latex may be frozen for coagulation or mechanically coagulated, for example, with a homogenizer as described in U.S. Pat. No. 5,463,021 (Beyer et al.). Alternatively or additionally, the fluoropolymer latex may be coagulated by adding polycations. It may also be useful to avoid acids and alkaline earth metal salts as coagulants to avoid metal contaminants. To avoid coagulation altogether and any contaminants from coagulants, spray drying the fluoropolymer latex after polymerization and optional ion-exchange purification may be useful to provide solid fluoropolymer.

A coagulated copolymer can be collected by filtration and washed with water. The washing water may, for example, be ion-exchanged water, pure water, or ultrapure water. The amount of the washing water may be from 1 to 5 times by mass to the copolymer, whereby the amount of the emulsifier attached to the copolymer can be sufficiently reduced by one washing.

In some embodiments of the method of making the copolymer according to the present disclosure, radical polymerization also can be carried out by suspension polymerization. Suspension polymerization will typically produce particle sizes up to several millimeters.

In some embodiments, the method of making the copolymer according to the present disclosure includes copolymerizing components including at least one compound represented by formula $CF_2{=}CF{-}O{-}(CF_2)_a{-}SO_2X$, optionally purifying the copolymer by ion-exchange purification, and spray drying the resulting dispersion. In contrast, a typical method for making ionomers can include copolymerizing components including short-chain $SO_2F$-containing vinyl ethers (e.g., $CF_2{=}CF{-}O{-}(CF_2)_a{-}SO_2F$), isolating a solid from the polymer dispersion, hydrolyzing the polymer, optionally purifying the polymer by ion exchange purification, and drying the resulting polymer. Thus, the method of the present disclosure can conveniently eliminate the steps of isolating solid polymer and hydrolyzing, resulting in a more efficient and cost-effective process.

The copolymer or ionomer produced can have less than 50 ppm metal ion content, in some embodiments, less than 25 ppm, less than 10 ppm, less than 5 ppm, or less than 1 ppm metal ion content. Specifically, metal ions such as alkali metals, alkaline earth metal, heavy metals (e.g., nickel, cobalt, manganese, cadmium, and iron) can be reduced. To achieve a metal ion content of less than 50 ppm, 25 ppm, 10 ppm. 5 ppm, or 1 ppm, polymerization can be conducted in the absence of added metal ions. For example, potassium persulfate, a common alternative initiator or co-initiator with ammonium persulfate, is not used, and mechanical and freeze coagulation described above may be used instead of coagulation with metal salts. It is also possible to use organic initiators as disclosed in U.S. Pat. No. 5,182,342 (Feiring et al.). To achieve such low ion content, ion exchange can be used, as described above, and the water for polymerization and washing may be deionized.

The metal ion content of the copolymer can be measured by flame atomic absorption spectrometry after combusting the copolymer and dissolving the residue in an acidic aqueous solution. For potassium as the analyte, the lower detection limit is less than 1 ppm.

Fluoropolymers obtained by aqueous emulsion polymerization with inorganic initiators (e.g. persulfates, $KMnO_4$, etc.) typically have a high number of unstable carbon-based end groups (e.g. more than 200 —COOM or —COF end groups per $10^6$ carbon atoms, wherein M is hydrogen, a metal cation, or $NH_2$). For fluorinated ionomers useful, for example, in an electrochemical cell, the effect naturally increases as sulfonate equivalent weight decreases. These carbonyl end groups are vulnerable to peroxide radical attacks, which reduce the oxidative stability of the fluorinated ionomers. During operation of a fuel cell, electrolysis cell, or other electrochemical cell, peroxides can be formed. This degrades the fluorinated ionomers, and correspondingly reduces the operational life of the given electrolyte membrane.

As polymerized, the copolymer according to the present disclosure and/or prepared by the method disclosed herein can have up to 400 —COOM and —COF end groups per $10^6$ carbon atoms, wherein M is independently an alkyl group, a hydrogen atom, a metallic cation, or a quaternary ammonium cation. Advantageously, in some embodiments, the copolymers according to the present disclosure and/or prepared by the method according to the present disclosure have up to 200 unstable end groups per $10^6$ carbon atoms. The unstable end groups are —COOM or —COF groups, wherein M is an alkyl group, a hydrogen atom, a metallic cation, or a quaternary ammonium cation. In some embodiments, the copolymers have up to 150, 100, 75, 50, 40, 30, 25, 20, 15, or 10 unstable end groups per $10^6$ carbon atoms. The number of unstable end groups can be determined by Fourier-transform infrared spectroscopy using the method described below. In some embodiments, the copolymers according to the present disclosure and/or prepared by the method according to the present disclosure have up to 200 (in some embodiments, up to 150, 100, 75, 50, 40, 30, 25, 20, 15, or 10) unstable end groups per $10^6$ carbon atoms, as polymerized. As described above, —$SO_2X$ end groups can be introduced in the copolymers according to the present disclosure by generating —$SO_3^-$ radicals during the polymerization process. In some embodiments, the copolymer according to the present disclosure has at least 5, 10, 15, 20, 25 30, 35, 40, or 50 —$SO_2X$ end groups per $10^6$ carbon atoms, wherein X is as defined above in any of its embodiments.

In some embodiments, reducing the number of unstable end groups can be accomplished by carrying out the polymerization in the method disclosed herein in the presence of a salt or pseudohalogen as described in U.S. Pat. No. 7,214,740 (Lochhaas et al.). Suitable salts can include a chloride anion, a bromide anion, an iodide anion, or a cyanide anion and a sodium, potassium, or ammonium cation. The salt used in the free-radical polymerization may be a homogenous salt or a blend of different salts. Examples of useful pseudohalogens nitrile-containing compounds, which provide nitrile end groups. Pseudohalogen nitrile-containing compounds have one or more nitrile groups and function in the same manner as compounds in which the nitrile groups are replaced with a halogen. Examples of suitable pseudohalogen nitrile-containing compounds include NC—CN, NC—S—S—CN, NC—Se—Se—CN, NCS—CN, NCSe—CN, Cl—CN, Br—CN, I—CN, NCN=NCN, and combinations thereof. During the free-radical polymerization, the reactive atoms/groups of the salts or the nitrile groups of the pseudohalogens chemically bond to at least one end of the backbone chain of the fluoropolymer. This provides $CF_2Y^1$ end groups instead of carbonyl end groups, wherein $Y^1$ is chloro, bromo, iodo, or nitrile. For example, if the free-radical polymerization is performed in the presence of a KCl salt, at least one of the end groups provided would be a —$CF_2Cl$ end group. Alternatively, if the free-radical polymerization is performed in the presence of a NC—CN pseudohalogen, at least one of the end groups provided would be a —$CF_2CN$ end group.

Post-fluorination with fluorine gas is also commonly used to cope with unstable end groups and any concomitant degradation. Post-fluorination of the fluoropolymer can convert —COOH, amide, hydride, —COF, —$CF_2Y^1$ and other nonperfluorinated end groups or —CF=$CF_2$ to —$CF_3$ end groups. The post-fluorination may be carried out in any convenient manner. The post-fluorination can be conveniently carried out with nitrogen/fluorine gas mixtures in ratios of 75-90:25-10 at temperatures between 20° C. and 250° C., in some embodiments in a range of 150° C. to 250° C. or 70° C. to 120° C., and pressures from 100 KPa to 1000 KPa. Reaction times can range from about four hours to about 16 hours. Under these conditions, most unstable carbon-based end groups are removed, whereas —$SO_2X$ groups mostly survive and are converted to —$SO_2F$ groups. In some embodiments, post-fluorination is not carried out when non-fluorinated polymers described above are used as monomers in the polymerization.

The groups $Y^1$ in the end groups —$CF_2Y^1$, described above, are reactive to fluorine gas, which reduces the time and energy required to poly-fluorinate the copolymers in these embodiments. We have also found that the presence of alkali-metal cations in the copolymer increases the decomposition rate of unstable carboxylic end-groups and therefore makes a subsequent post-fluorination step, if needed, easier, faster, and cheaper.

For copolymers in which the —$SO_2X$ groups are converted to —$SO_2F$ groups by post-fluorination, the copolymer can be treated with an amine (e.g., ammonia) to provide a sulfonamide (e.g., having —$SO_2NH_2$ groups). Sulfonamides made in this manner or prepared by using $CF_2$=CF—O—$(CF_2)_a$—$SO_2NH_2$ in the components that are polymerized as described above can be further reacted with multi-functional sulfonyl fluoride or sulfonyl chloride compounds. Examples of useful multi-functional compounds include 1,1,2,2-tetrafluoroethyl-1,3-disulfonyl fluoride; 1,1,2,2,3,3-hexafluoropropyl-1,3-disulfonyl fluoride; 1,1,2,2,3,3,4,4-octafluorobutyl-1,4-disulfonyl fluoride; 1,1,2,2,3,3,4,4,5,5-perfluorobutyl-1,5-disulfonyl fluoride; 1,1,2,2-tetrafluoroethyl-1,2-disulfonyl chloride; 1,1,2,2,3,3-hexafluoropropyl-1,3-disulfonyl chloride; 1,1,2,2,3,3,4,4-octafluorobutyl-1,4-disulfonyl chloride; and 1,1,2,2,3,3,4,4,5,5-perfluorobutyl-1,5-disulfonyl chloride. After hydrolysis of the sulfonyl halide groups, the resulting copolymer can have a higher number of ionic groups than the copolymer as polymerized. Thus, the number of ionic groups can be increased and the equivalent weight decreased without affecting the backbone structure of the copolymer. Also, using a deficient amount multi-functional sulfonyl fluoride or sulfonyl chloride compounds can result in crosslinking of the polymer chains, which may be useful to improve durability in some cases (e.g., for copolymers having low equivalent weights). Further details can be found, for example, in U.S. Pat. Appl. Publ. No. 20020160272 (Tanaka et al.). To prevent such crosslinking, if desired, copolymers bearing $SO_2NH_2$ groups can be treated with compounds represented by formula $FSO_2(CF_2)_{1-6}SO_3H$, which can be made by hydrolyzing any of the multi-functional sulfonyl fluorides or sulfonyl chlorides described above with one equivalent of water in the presence of base (e.g., N,N-diisopropylethylamine (DIPEA)) as described in JP 2011-40363, published Feb. 24, 2011. Copolymers bearing $SO_2NH_2$ groups can also treated with polysulfonimides represented by formula $FSO_2(CF_2)_a[SO_2NZSO_2(CF_2)_a]_{1-10}SO_2F$ or $FSO_2(CF_2)_a[SO_2NZSO_2(CF_2)_a]_{1-10}SO_3H$, wherein each a is independently 1 to 6, 1 to 4, or 2 to 4. To make a polysulfonimide, a sulfonyl halide monomer (e.g., any of those described above) and a sulfonamide monomer represented by formula $H_2NSO_2(CF_2)_aSO_2NH_2$ are made to react in the mole ratio of (k+1)/k. The reaction may be carried out, for example, in a suitable solvent (e.g., acetonitrile) at 0° C. in the presence of base. The sulfonyl halide monomer and sulfonamide monomer may have the same or different values of a, resulting in the same or different value of a for each repeating unit. The resulting product $FSO_2(CF_2)_a[SO_2NZSO_2(CF_2)_a]_{1-10}SO_2F$ may be treated with one equivalent of water in the presence of base (e.g., N,N-diisopropylethylamine (DIPEA)) to provide $FSO_2(CF_2)_a[SO_2NZSO_2(CF_2)_a]_{1-10}SO_3H$, as described in JP 2011-40363.

In other embodiments, copolymers in which the $SO_2X$ groups are converted to $SO_2F$ groups by post-fluorination can be treated with small molecule sulfonamides such as those represented by formula $NH_2SO_2(CF_2)_{1-6}S_3Z$, wherein Z is as defined above in any of its embodiments, to provide —$SO_2NHS_2(CF_2)_{1-6}SO_3Z$ groups. Compounds represented by formula $NH_2SO_2(CF_2)_{1-6}SO_3Z$ may be synthesized by reacting cyclic perfluorodisulfonic acid anhydrides with amines according to the methods described in U.S. Pat. No. 4,423,197 (Behr). This can also provide copolymers with very low equivalent weights.

This fluoropolymer made according to the method of the present disclosure may be useful, for example, in the manufacture of polymer electrolyte membranes for use in fuel cells or other electrolytic cells. The fluoropolymer made according to the method of the present disclosure may be formed into a polymer electrolyte membrane by any suitable method, including casting, molding, and extrusion. Typically, the membrane is cast from a latex or suspension of the fluoropolymer and then dried, annealed, or both. Typically, if the dispersion of ionic fluoropolymer is to be used to form a membrane, the concentration of ionic fluoropolymer is increased to a high level (e.g., at least 30 or 40 percent by weight) and a water-miscible organic solvent is added to facilitate film formation. Examples of water-miscible solvents include, lower alcohols (e.g., methanol, ethanol, isopropanol, n-propanol), polyols (e.g., ethylene glycol, propylene glycol, glycerol), ethers (e.g., tetrahydrofuran and dioxane), ether acetates, acetonitrile, acetone, and combinations thereof. The copolymer may be cast from a suspension. Any suitable casting method may be used, including bar coating, spray coating, slit coating, and brush coating. After forming, the membrane may be annealed, typically at a temperature of 120° C. or higher, more typically 130° C. or higher, most typically 150° C. or higher. In some embodiments of the method according to the present disclosure, a polymer electrolyte membrane can be obtained by obtaining the dispersion of the fluoropolymer, optionally purifying the dispersion by ion-exchange purification, and concentrating the dispersion as described above to make a membrane.

In some embodiments of the method according to the present disclosure or the polymer made by this method, a salt of at least one of cerium, manganese or ruthenium or one or more cerium oxide or zirconium oxide compounds is added to the acid form of the polymer electrolyte before membrane formation. Typically the salt of cerium, manganese, or ruthenium and/or the cerium or zirconium oxide compound is mixed well with or dissolved within the polymer electrolyte to achieve substantially uniform distribution.

The salt of cerium, manganese, or ruthenium may comprise any suitable anion, including chloride, bromide, hydroxide, nitrate, sulfonate, acetate, phosphate, and carbonate. More than one anion may be present. Other salts may be present, including salts that include other metal cations or ammonium cations. Once cation exchange occurs between the transition metal salt and the acid form polymer, it may be desirable for the acid formed by combination of the liberated proton and the original salt anion to be removed. Thus, it may be useful to use anions that generate volatile or soluble acids, for example chloride or nitrate. Manganese cations may be in any suitable oxidation state, including $Mn^{2+}$, $Mn^{3+}$, and $Mn^{4+}$, but are most typically $Mn^{2+}$. Ruthenium cations may be in any suitable oxidation state, including $Ru^{3+}$ and $Ru^{4+}$, but are most typically $Ru^{3+}$. Cerium cations may be in any suitable oxidation state, including $Ce^{3+}$ and $Ce^{4+}$. Without wishing to be bound by theory, it is believed that the cerium, manganese, or ruthenium cations persist in the polymer electrolyte because they are exchanged with $H^+$ ions from the anion groups of the polymer electrolyte and become associated with those anion groups. Furthermore, it is believed that polyvalent cerium, manganese, or ruthenium cations may form crosslinks between anion groups of the polymer electrolyte, further adding to the stability of the polymer. In some embodiments, the salt may be present in solid form. The cations may be present in a combination of two or more forms including solvated cation, cation associated with bound anion groups of the polymer electrolyte membrane, and cation bound in a salt precipitate. The amount of salt added is typically between 0.001 and 0.5 charge equivalents based on the molar amount of acid functional groups present in the polymer electrolyte, more typically between 0.005 and 0.2, more typically between 0.01 and 0.1, and more typically between 0.02 and 0.05. Further details for combining an anionic copolymer with cerium, manganese, or ruthenium cations can be found in U.S. Pat. Nos. 7,575,534 and 8,628,871, each to Frey et al.

The cerium oxide compound may contain cerium in the (IV) oxidation state, the (III) oxidation state, or both and may be crystalline or amorphous. The cerium oxide may be, for example, $CeO_2$ or $Ce_2O_3$. The cerium oxide may be substantially free of metallic cerium or may contain metallic cerium. The cerium oxide may be, for example, a thin oxidation reaction product on a metallic cerium particle. The cerium oxide compound may or may not contain other metal elements. Examples of mixed metal oxide compounds comprising cerium oxide include solid solutions such as zirconia-ceria and multicomponent oxide compounds such as barium cerate. Without wishing to be bound by theory, it is believed that the cerium oxide may strengthen the polymer by chelating and forming crosslinks between bound anionic groups. The amount of cerium oxide compound added is typically between 0.01 and 5 weight percent based on the total weight of the copolymer, more typically between 0.1 and 2 weight percent, and more typically between 0.2 and 0.3 weight percent. The cerium oxide compound is typically present in an amount of less than 1% by volume relative to the total volume of the polymer electrolyte membrane, more typically less than 0.8% by volume, and more typically less than 0.5% by volume. Cerium oxide may be in particles of any suitable size, in some embodiments, between 1 and 5000 nm, 200-5000 nm, or 500-1000 nm. Further details regarding polymer electrolyte membranes including cerium oxide compounds can be found in U.S. Pat. No. 8,367,267 (Frey et al.).

The present disclosure provides a membrane electrode assembly comprising the polymer electrolyte membrane made from the fluoropolymer prepared as described above. A membrane electrode assembly (MEA) is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. Each electrode layer includes electrochemical catalysts, typically including platinum metal. Gas diffusion layers (GDL's) facilitate gas transport to and from the anode and cathode electrode materials and conduct electrical current. The GDL may also be called a fluid transport layer (FTL) or a diffuser/current collector (DCC). The anode and cathode electrode layers may be applied to GDL's in the form of a catalyst ink, and the resulting coated GDL's sandwiched with a PEM to form a five-layer MEA. Alternately, the anode and cathode electrode layers may be applied to opposite sides of the PEM in the form of a catalyst ink, and the resulting catalyst-coated membrane (CCM) sandwiched with two GDL's to form a five-layer MEA. In a typical PEM fuel cell, protons are formed at the anode via hydrogen oxidation and transported across the PEM to the cathode to react with oxygen, causing electrical current to flow in an external circuit connecting the electrodes. The PEM forms a durable, non-porous, electrically non-conductive mechanical barrier between the reactant gases, yet it also passes $H^+$ ions readily.

To make an MEA or CCM, catalyst may be applied to the PEM by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications. A variety of catalysts may be useful. Typically, carbon-supported catalyst particles are used. Typical carbon-supported catalyst particles are 50-90% carbon and 10-50% catalyst metal by weight, the catalyst metal typically comprising Pt for the cathode and Pt and Ru in a weight ratio of 2:1 for the anode. Typically, the catalyst is applied to the PEM or to the FTL in the form of a catalyst ink. Alternately, the catalyst ink may be applied to a transfer substrate, dried, and thereafter applied to the PEM or to the FTL as a decal. The catalyst ink typically comprises polymer electrolyte material. The copolymer according to the present disclosure and/or made according to the method disclosed herein may be useful as a polymer electrolyte in a catalyst ink composition. The copolymer may have the same or different composition as that used in the polymer electrolyte membrane (e.g., the polymer electrolyte membrane and catalyst ink may use different embodiments of the copolymer disclosed herein.) The catalyst ink typically comprises a dispersion of catalyst particles in a dispersion of the polymer electrolyte. The ink typically contains 5-30% solids (i.e. polymer and catalyst) and more typically 10-20% solids. The electrolyte dispersion is typically an aqueous dispersion, which may additionally contain alcohols and polyalcohols such a glycerin and ethylene glycol. The water, alcohol, and polyalcohol content may be adjusted to alter rheological properties of the ink. The ink typically contains 0-50% alcohol and 0-20% polyalcohol. In addition, the ink may contain 0-2% of a suitable dispersant. The ink is typically made by stirring with heat followed by dilution to a coatable consistency. Further details concerning the preparation of catalyst inks and their use in membrane assemblies can be found, for example, in U.S. Pat. Publ. No. 2004/0107869 (Velamakanni et al.)

To make an MEA, GDL's may be applied to either side of a CCM by any suitable means. Any suitable GDL may be used in the practice of the present invention. Typically the GDL is comprised of sheet material comprising carbon fibers. Typically the GDL is a carbon fiber construction selected from woven and non-woven carbon fiber constructions. Carbon fiber constructions which may be useful in the practice of the present invention may include Toray™ Carbon Paper, SpectraCarb™ Carbon Paper, AFN™ non-woven carbon cloth, and Zoltek™ Carbon Cloth. The GDL may be coated or impregnated with various materials, including carbon particle coatings, hydrophilizing treatments, and hydrophobizing treatments such as coating with polytetrafluoroethylene (PTFE).

In use, the MEA according to the present typically sandwiched between two rigid plates, known as distribution plates, also known as bipolar plates (BPP's) or monopolar plates. Like the GDL, the distribution plate is typically electrically conductive. The distribution plate is typically made of a carbon composite, metal, or plated metal material. The distribution plate distributes reactant or product fluids to and from the MEA electrode surfaces, typically through one or more fluid-conducting channels engraved, milled, molded or stamped in the surface(s) facing the MEA(s). These channels are sometimes designated a flow field. The distribution plate may distribute fluids to and from two consecutive MEA's in a stack, with one face directing fuel to the anode of the first MEA while the other face directs oxidant to the cathode of the next MEA (and removes product water), hence the term "bipolar plate." Alternately, the distribution plate may have channels on one side only, to distribute fluids to or from an MEA on only that side, which may be termed a "monopolar plate." A typical fuel cell stack comprises a number of MEA's stacked alternately with bipolar plates.

Another type of electrochemical device is an electrolysis cell, which uses electricity to produce chemical changes or chemical energy. An example of an electrolysis cell is a chlor-alkali membrane cell where aqueous sodium chloride is electrolyzed by an electric current between an anode and a cathode. The electrolyte is separated into an anolyte portion and a catholyte portion by a membrane subject to harsh conditions. In chlor-alkali membrane cells, caustic sodium hydroxide collects in the catholyte portion, hydrogen gas is evolved at the cathode portion, and chlorine gas is evolved from the sodium chloride-rich anolyte portion at the anode.

The polymer electrolyte membrane made in some embodiments of the method disclosed herein may have a thickness of up to 90 microns, up to 60 microns, or up to 30 microns. A thinner membrane may provide less resistance to the passage of ions. In fuel cell use, this results in cooler operation and greater output of usable energy. Thinner membranes must be made of materials that maintain their structural integrity in use.

In some embodiments, the copolymer made by the method disclosed herein may be imbibed into a porous supporting matrix, typically in the form of a thin membrane having a thickness of up to 90 microns, up to 60 microns, or up to 30 microns. Any suitable method of imbibing the polymer into the pores of the supporting matrix may be used, including overpressure, vacuum, wicking, and immersion. In some embodiments, the polymer is embedded in the matrix upon crosslinking. Any suitable supporting matrix may be used. Typically the supporting matrix is electrically non-conductive. Typically, the supporting matrix is composed of a fluoropolymer, which is more typically perfluorinated. Typical matrices include porous polytetrafluoroethylene (PTFE), such as biaxially stretched PTFE webs. In another embodiment fillers (e.g. fibers) might be added to the polymer to reinforce the membrane.

The copolymer according to the present disclosure and/or made by the method according to the present disclosure may also be useful has a binder for an electrode in other electrochemical cells (for example, lithium ion batteries). To make electrodes, powdered active ingredients can be dispersed in a solvent with the copolymer and coated onto a metal foil substrate, or current collector. The resulting composite electrode contains the powdered active ingredient in the polymer binder adhered to the metal substrate. Useful active materials for making negative electrodes include alloys of main group elements and conductive powders such as graphite. Example of useful active materials for making a negative electrode include oxides (tin oxide), carbon compounds (e.g., artificial graphite, natural graphite, soil black lead, expanded graphite, and scaly graphite), silicon carbide compounds, silicon-oxide compounds, titanium sulfides, and boron carbide compounds. Useful active materials for making positive electrodes include lithium compounds, such as $Li_{4/3}Ti_{5/3}O_4$, $LiV_3O_8$, $LiV_2O_5$, $LiCo_{0.2}Ni_{0.8}O_2$, $LiNiO_2$, $LiFePO_4$, $LiMnPO_4$, $LiCoPO_4$, $LiMn_2O_4$, and $LiCoO_2$. The electrodes can also include electrically conductive diluents and adhesion promoters.

Electrochemical cells including the copolymer disclosed herein as a binder can be made by placing at least one each of a positive electrode and a negative electrode in an electrolyte. Typically, a microporous separator can be used to prevent the contact of the negative electrode directly with the positive electrode. Once the electrodes are connected externally, lithiation and delithiation can take place at the electrodes, generating a current. A variety of electrolytes can be employed in a lithium-ion cell. Representative electrolytes contain one or more lithium salts and a charge-carrying medium in the form of a solid, liquid, or gel. Examples of lithium salts include $LiPF_6$, $LiBF_4$, $LiClO_4$, lithium bis(oxalato)borate, $LiN(CF_3SO_2)_2$, $LiN(C_2F_5SO_2)_2$, $LiAsF_6$, $LiC(CF_3SO_2)_3$, and combinations thereof. Examples of solid charge carrying media include polymeric media such as polyethylene oxide, polytetrafluoroethylene, polyvinylidene fluoride, fluorine-containing copolymers, polyacrylonitrile, combinations thereof, and other solid media that will be familiar to those skilled in the art. Examples of liquid charge carrying media include ethylene carbonate, propylene carbonate, dimethyl carbonate, diethyl carbonate, ethyl methyl carbonate, butylene carbonate, vinylene carbonate, fluoroethylene carbonate, fluoropropylene carbonate, γ-butyrolactone, methyl difluoroacetate, ethyl difluoroacetate, dimethoxyethane, diglyme (bis(2-methoxyethyl) ether), tetrahydrofuran, dioxolane, combinations thereof and other media that will be familiar to those skilled in the art. Examples of charge carrying media gels include those described in U.S. Pat. Nos. 6,387,570 (Nakamura et al.) and 6,780,544 (Noh). The electrolyte can include other additives (e.g., a cosolvent or a redox chemical shuttle).

The electrochemical cells can be useful as rechargeable batteries and can be used in a variety of devices, including portable computers, tablet displays, personal digital assistants, mobile telephones, motorized devices (e.g., personal or household appliances and vehicles), instruments, illumination devices (e.g., flashlights) and heating devices. One or more of the electrochemical cells can be combined to provide battery pack.

SOME EMBODIMENTS OF THE DISCLOSURE

In a first embodiment, the present disclosure provides a method of making a copolymer, the method comprising copolymerizing components comprising tetrafluoroethylene and at least one compound represented by formula $CF_2=CF-O-(CF_2)_a-SO_2X$ to form the copolymer, wherein a is a number from 1 to 4, and X is —NZH, $NZ-SO_2-(CF_2)_{1-6}-SO_2X'$, or —OZ, wherein each Z is independently a hydrogen, an alkali metal cation or a quaternary ammonium cation, wherein X' is —NZH or —OZ, and wherein the components comprise at least 60 mole % of tetrafluoroethylene based on the total amount of components.

In a second embodiment, the present disclosure provides the method of the first embodiment, wherein components to be copolymerized are substantially free of a compound represented by formula $CF_2=CF-O-(CF_2)_a-SO_2F$, wherein a is a number from 1 to 4.

In a third embodiment, the present disclosure provides the method of the first or second embodiment, wherein the method does not include at least one of coagulating to isolate the copolymer as a solid or hydrolyzing the copolymer formed.

In a fourth embodiment, the present disclosure provides the method of any one of first to third embodiments, wherein the components further comprise perfluoroalkyl vinyl ether; perfluoroalkoxyalkyl vinyl ether; a fluorinated olefin represented by formula $C(R)_2=CF-Rf$, wherein Rf is fluorine or a perfluoroalkyl having from 1 to 8 carbon atoms and each R is independently hydrogen, fluorine, or chlorine; or a combination thereof.

In a fifth embodiment, the present disclosure provides the method of the fourth embodiment, wherein the components further comprise at least one of hexafluoropropylene, perfluoromethyl vinyl ether, perfluoropropyl vinyl ether, perfluoro-3-methoxy-n-propyl vinyl ether, tetrafluoropropene, or vinylidene fluoride.

In a sixth embodiment, the present disclosure provides the method of any one of the first to fifth embodiments, wherein copolymerizing is carried out by aqueous emulsion polymerization.

In a seventh embodiment, the present disclosure provides the method of any one of the first to sixth embodiments, wherein the copolymerizing is carried out at a pH higher than 8.

In an eighth embodiment, the present disclosure provides the method of any one of the first to seventh embodiments, wherein copolymerizing is carried out in the presence of a bisulfate or sulfite salt to generate —$SO_2X$ end groups, wherein X is independently —NZH, —NZ—$SO_2$—$(CF_2)_{1-6}$—$SO_2X'$, or —OZ, wherein Z is independently a hydrogen, a metal cation or a quaternary ammonium cation, and wherein X' is independently —NZH or —OZ.

In a ninth embodiment, the present disclosure provides the method of any one of the first to eighth embodiments, wherein a is 2.

In a tenth embodiment, the present disclosure provides the method of any one of the first to eighth embodiments, wherein X is —OZ.

In an eleventh embodiment, the present disclosure provides the method of any one of the first to tenth embodiments, wherein Z is an alkali metal cation. In some of these embodiments, Z is sodium.

In a twelfth embodiment, the present disclosure provides the method of any one of the first to eleventh embodiments, wherein the copolymerizing is carried out in the absence of a fluorinated emulsifier.

In a thirteenth embodiment, the present disclosure provides the method of any one of the first to the twelfth embodiments, wherein the copolymer has an —$SO_2X$ equivalent weight of up to 1000.

In a fourteenth embodiment, the present disclosure provides the method of any one of the first to thirteenth embodiments, wherein the copolymer has an —$SO_2X$ equivalent weight of up to 700.

In a fifteenth embodiment, the present disclosure provides the method of any one of the first to thirteenth embodiments, wherein the copolymer comprises anionic species that are not covalently bound to the copolymer, the method further comprising contacting the dispersion of the copolymer with an anion exchange resin having associated hydroxide ions, and exchanging at least a portion of the anionic species with the hydroxide ions to provide an anionic exchanged dispersion.

In a sixteenth embodiment, the present disclosure provides the method of any one of the first to fifteenth embodiments, wherein the copolymer comprises cationic species that are not covalently bound to the copolymer, the method further comprising contacting the dispersion of the copolymer with a cation exchange resin having acidic protons, and exchanging at least a portion of the cationic species with the protons to provide cation-exchanged dispersion.

In a seventeenth embodiment, the present disclosure provides the method of any one of the first to sixteenth embodiments, further comprising spray drying the copolymer.

In an eighteenth embodiment, the present disclosure provides the method of any one of the first to seventeenth embodiments, further comprising post-fluorinating the copolymer.

In a nineteenth embodiment, the present disclosure provides a method of the eighteenth embodiment, further comprising treating the post-fluorinated copolymer with ammonia to provide —$SO_2$—$NH_2$ groups on the copolymer In a twentieth embodiment, the present disclosure provides the method of any one of the first to seventeenth embodiments, wherein at least a portion of X groups are —NZH groups. In of these embodiments, Z is H.

In a twenty-first embodiment, the present disclosure provides the method of the nineteenth or twentieth embodiment, further comprising treating the copolymer with a disulfonyl fluoride or disulfonyl chloride.

In a twenty-second embodiment, the present disclosure provides the method of any one of the first to twenty-first embodiments, wherein the components further comprise at least one of ethylene, propylene, isobutylene, ethyl vinyl ether, vinyl benzoate, ethyl allyl ether, cyclohexyl allyl ether, norbornadiene, crotonic acid, an alkyl crotonate, acrylic acid, an alkyl acrylate, methacrylic acid, an alkyl methacrylate, or hydroxybutyl vinyl ether.

In a twenty-third embodiment, the present disclosure provides the method of any one of the first to twenty-second embodiments, further comprising combining the copolymer with at least one of cerium cations, manganese cations, ruthenium cations, or a cerium oxide.

In a twenty-fourth embodiment, the present disclosure provides the method of the twenty-third embodiment, wherein the at least one of cerium cations, manganese cations, or ruthenium cations are present in a range from 0.2 to 20 percent relative to the amount of sulfonate groups in the copolymer.

In a twenty-fifth embodiment, the present disclosure provides the method of any one of the first to twenty-fourth embodiments, further comprising forming a membrane comprising the copolymer.

In a twenty-sixth embodiment, the present disclosure provides the method of any one of the first to twenty-fourth embodiments, further comprising combining the copolymer with a catalyst to provide a catalyst ink.

In a twenty-seventh embodiment, the present disclosure provides the method of any one of the first to twenty-fourth embodiments, further comprising combining the copolymer with a lithium compound to provide an electrode.

In a twenty-eighth embodiment, the present disclosure provides a polymer made by the method of any one of the first to twenty-fifth embodiments.

In a twenty-ninth embodiment, the present disclosure provides the polymer of the twenty-eighth embodiment, wherein as polymerized, the copolymer has up to 200—COOM and —COF end groups per $10^6$ carbon atoms, wherein M is independently an alkyl group, a hydrogen atom, a metallic cation, or a quaternary ammonium cation.

In a thirtieth embodiment, the present disclosure provides a polymer electrolyte membrane comprising a copolymer made by the method of any one of the first to twenty-fifth embodiments.

In a thirty-first embodiment, the present disclosure provides a catalyst ink comprising a copolymer made by the method of any one of the first to twenty-fourth embodiments.

In a thirty-second embodiment, the present disclosure provides a membrane electrode assembly comprising at least one of the polymer electrolyte membrane of the thirtieth embodiment or the catalyst ink of the thirty-first embodiment.

In a thirty-third embodiment, the present disclosure provides a binder for an electrode comprising a copolymer made by the method of any one of the first to twenty-fourth embodiments.

In a thirty-fourth embodiment, the present disclosure provides an electrochemical cell comprising the binder of the thirty-third embodiment.

The following specific, but non-limiting, examples will serve to illustrate the present disclosure. In these examples, abbreviations include g for grams, kg for kilograms, m for mass, µm for micrometers, min for minutes, mm for millimeters, mL for milliliters, L for liters, mol for moles, h for hours, ppm for parts per million, cm for centimeters, ° C. for degrees Celsius, rpm for revolutions per minute. PMVE is perfluoromethyl vinyl ether. PPVE-1 is perfluoropropyl vinyl ether ($CF_2$=$CFOCF_2CF_2CF_3$).

EXAMPLES

Test Methods:
Copolymer Composition $^{19}$F-NMR spectra were used to determine the composition of the purified polymers. A Bruker Avance II 300 spectrometer with a 5 mm Broadband probe was used. Samples of about 7 weight percent polymer, 54 weight percent Methanol/or Propanol-1), and 39 weight percent $H_2O$ were measured. Signals for the $CF_2$=CF—O—$CF_2$—$CF_2SO_3^-$ were detected between −70 to −80 ppm, −100 to −110 ppm and −130 to −140 ppm; the $CF_2$'s from the polymer backbone were at about −110 to −130 ppm. The $CF_3$-group from PMVE was detected at about −53 to −55 ppm, the $CF_3$-group from PPVE-1 was at about −84 to −86 ppm, and the adjacent $CF_2$-group ($CF_3$—$\underline{C}F_2$—$CF_2$—O—) was detected between −128 to −130 ppm.

Determination of Carboxyl Endgroups:

A Fourier transform infrared spectroscopy (FT-IR) measurement was used to determine the number of Carboxyl endgroups per $10^6$ C-atoms in the TFE-$CF_2$=CF—O—$CF_2$—$CF_2$—$SO_3$Na-polymer, the TFE-$CF_2$=CF—O—$CF_2$—$CF_2$—$SO_3$Na-PPVE-1-polymer, and the TFE-$CF_2$=CF—O—$CF_2$—$CF_2$—$SO_3$Na-PMVE-polymer. The measurement was performed by FT-IR in a transmission technique. The measured sample had a film thickness of 100 µm. The wave numbers of the COOH peaks of interest are 1776 cm$^{-1}$ and 1807 cm$^{-1}$. The wave number of the C(O)F peak (C(O)F will convert to a carboxyl group) is 1885 cm$^{-1}$.

To quantify the amount of carboxyl (C(O)F) endgroups of the polymer, two IR spectra were taken. One from the carboxyl containing sample and one from a reference sample (without carboxyl groups). The number of endgroups per $10^6$ C-atoms can calculated via equations 1, 2 and 3 for $F_1$, $F_2$ and $F_3$:

$$(\text{peak high} \times F_1)/\text{film thickness [mm]} \quad (1)$$

$$(\text{peak high} \times F_2)/\text{film thickness [mm]} \quad (2)$$

$$(\text{peak high} \times F_3)/\text{film thickness [mm]} \quad (3)$$

with $F_1$: calculated factor related to the reference spectrum and $v=1776$ cm$^{-1}$ $F_2$: calculated factor related to the reference spectrum and $v=1807$ cm$^{-1}$ $F_3$: calculated factor related to the reference spectrum and $v=1885$ cm$^{-1}$ The sum of the results from the equations 1 to 3 yield the number of endgroups per $10^6$ C-atoms.

Synthesis of sodium 1,1,2,2-tetrafluoro-2-[(trifluoroethenyl) oxylethanesulfonate (Na[O$_3$S—CF$_2$—CF$_2$—O—CF=CF$_2$])

Part A: 2,3,3,3-tetrafluoro-2-[1,1,2,2-tetrafluoro-2-(fluorosulfonyl)ethoxy]propanoyl fluoride (FO$_2$S—CF$_2$—CF$_2$—O—CF(CF$_3$)—C(O)F)

A steel vessel was charged with CsF (26.5 g, 0.2 mol) suspended in tetraglyme (900 g, 4 mol) and difluoro(fluorosulfonyl)acetyl fluoride (F(O)$_2$S—CF$_2$—C(O)F; 1050 g, 5.8 mol) at 20° C. under inert conditions. During 5.5 h, HFPO (1000 g, 6 mol) was added under intensive stirring at 20° C. Subsequently, a biphasic mixture was observed (bottom phase: 1.840 g; upper phase: 990 g). The bottom phase was separated and purified through distillation. The yield of isolated FO$_2$S—CF$_2$—CF$_2$—O—CF(CF$_3$)—C(O)F was 91% (1819 g, 5.3 mol; boiling point 89-90° C.).

Part B: 2,4,4,5,5-pentafluoro-2-(trifluoromethyl)-1,3-oxathiolane 3,3-dioxide

A 1 L double jacket glass flask (equipped with a magnetic stirrer, thermometer, dropping funnel, cooling condenser, and cryostat) was charged with pre-dried anhydrous Na$_2$CO$_3$ (128 g, 1.2 mol) suspended in tetraglyme (390 g, 2 mol) at 20° C. Then, FO$_2$S—CF$_2$—CF$_2$—O—CF(CF$_3$)—C(O)F (340 g, 1 mol) was added in this manner that the reaction temperature never exceeded 30° C. during the addition. After addition, the reaction mixture was stirred 1.5 h at 40° C. and 1 h at 60° C. After cooling to 20° C., the reflux condenser was substituted by a column and a distillation apparatus and the reaction mixture was thermolyzed at temperatures up to 160° C. The desired product was obtained as a clear colorless liquid. The yield of 2,4,4,5,5-pentafluoro-2-(trifluoromethyl)-1,3-oxathiolane 3,3-dioxide was 70% (196 g, 0.7 mol).

Part C: Na[O$_3$S—CF$_2$—CF$_2$—O—CF=CF$_2$]

A 1 L double jacket glass flask (equipped with a magnetic stirrer, thermometer, dropping funnel, cooling condenser, and cryostat) was charged with sodium methylate (35 g, 0.7 mol) and diethyl ether (400 g, 5 mol). Over 1 h, 2,4,4,5,5-pentafluoro-2-(trifluoromethyl)-1,3-oxathiolane 3,3-dioxide (190 g, 0.7 mol) was added in portions at 20° C. Afterwards, the biphasic reaction mixture was stirred over night at 20° C. until a clear solution was observed. Then, the solvent and volatile byproducts were removed at a rotary evaporator up to 60° C. until constant mass. The yield of isolated Na[O$_3$S—CF$_2$—CF$_2$—O—CF=CF$_2$] was 86% (177 g, 0.6 mol).

Example 1

A 4-L polymerization kettle equipped with an impeller agitator system (320 rpm) was charged with 2400 g H$_2$O and 440 g of a 22 weight percent aqueous solution of CF$_2$=CF—O—CF$_2$CF$_2$—SO$_3$Na. The pH was adjusted to 9.5 by adding a 10 weight percent solution of ammonia in deionized water. The kettle was heated up to 70° C. and TFE was add to reach 6 bar absolute reaction pressure. The polymerization was initiated by feeding 8 g ammonium persulfate in 100 mL H$_2$O.

After a pressure drop, feeding of 9 weight percent aqueous solution of CF$_2$=CF—O—CF$_2$CF$_2$—SO$_3$Na and gaseous TFE (ratio TFE: CF$_2$=CF—O—CF$_2$CF$_2$—SO$_3$Na=83 mol %:17 mol %) was continued. After 140 min, the polymerization was stopped. The solid content of the resulting Polymer Dispersion A was 7 weight percent. The isolated ionomer had a —SO$_3$Na equivalent weight of 580. The number of carboxyl end groups was determined to be 214 per $10^6$ carbon atoms using the method described above.

Example 2

A 4-L polymerization kettle equipped with an impeller agitator system (320 rpm) was charged with 2400 g H$_2$O and 440 g of a 22 weight percent aqueous solution of CF$_2$=CF—O—CF$_2$—CF$_2$—SO$_3$Na. The pH value was adjusted to 9.4 by adding a 10 weight percent solution of ammonia in deionized water. The kettle was heated up to 60° C. and further charged with gaseous TFE to 6 bar absolute reaction pressure. The polymerization was initiated by addition of 2 g sodium disulfite and 4 g ammonium persulfate in water.

After a pressure drop, an additional feed of a 9 weight percent aqueous solution of CF$_2$=CF—O—CF$_2$—CF$_2$—SO$_3$Na and gaseous TFE (molar ratio TFE:CF$_2$=CF—O—CF$_2$—CF$_2$—SO$_3$Na=83%:17%) was added. During the course of reaction the polymerization temperature was maintained at 60° C. After 170 minutes the polymerization was stopped. The solid content of the resulting Polymer Dispersion B was 8.5 weight percent. The isolated ionomer SO$_3$Na equivalent weight was 595. The number of carboxyl end groups was determined to be 76 per $10^6$ carbon atoms using the method described above.

Example 3

A 4-L polymerization kettle equipped with an impeller agitator system (320 rpm) was charged with 2400 g H$_2$O and 51 g (0.17 mol) CF$_2$=CF—O—CF$_2$—CF$_2$—SO$_3$Na (as a 17 weight percent aqueous solution). The basic pH value was adjusted by adding 100 g of a 10 weight percent solution of ammonia in deionized water.

The kettle was heated up to 70° C. and was further charged with 102 g (1.02 mol) gaseous TFE to 6 bar absolute reaction pressure. The polymerization was initiated by addition of a solution of 10 g ammonium persulfate in 30 g deionized water.

After a pressure drop, a feed of additional 27 g (0.09 mol) CF$_2$=CF—O—CF$_2$—CF$_2$—SO$_3$Na (as a 9 weight percent aqueous solution), 18 g (0.07 mol) PPVE-1, and 43 g (0.43 mol) TFE was started. During the course of reaction further 3 g ammonium persulfate was added, and the polymerization temperature was maintained at 70° C.

After 138 minutes the polymerization was stopped. The solid content of the resulting Polymer Dispersion C was 4.3 weight percent. The isolated ionomer (141 g) contained 82 mol-% TFE, 13 mol-% CF$_2$=CF—O—CF$_2$CF$_2$—SO$_3$Na and 5 mol-% PPVE-1 as determined by $^{19}$F-NMR spectroscopic analysis. The SO$_3$Na equivalent weight of the ionomer was 969. The number of carboxyl end groups was determined to be 174 per $10^6$ carbon atoms using the method described above.

Example 4

A 4-L polymerization kettle equipped with an impeller agitator system (320 rpm) was charged with 2400 g $H_2O$ and 50 g (0.17 mol) of $CF_2$=CF—O—$CF_2$—$CF_2$—$SO_3Na$ (as a 17 weight percent aqueous solution). The basic pH value was adjusted by adding 100 g of a 10 weight percent solution of ammonia in deionized water.

The kettle was heated up to 70° C. and was further charged with 102 g (1.02 mol) gaseous TFE to 6 bar absolute reaction pressure. The polymerization was initiated by addition of a solution of 8 g ammonium persulfate in 24 g deionized water.

After a pressure drop the feed of additional 40 g (0.13 mol) $CF_2$=CF—O—$CF_2$—$CF_2$—$SO_3Na$ (as a 9 weight percent aqueous solution), 25 g (0.15 mol) PMVE, and 60 g (0.6 mol) TFE was started. During the course of reaction the polymerization temperature was maintained at 70° C.

After 119 minutes the polymerization was stopped. The solid content of the resulting Polymer Dispersion D was 5 weight percent. The isolated ionomer (168 g) contained 80 mol-% TFE, 11 mol-% $CF_2$=CF—O—$CF_2CF_2$—$SO_3Na$ and 9 mol-% PMVE as determined by $^{19}F$-NMR spectroscopic analysis. The $SO_3Na$ equivalent weight of the ionomer was 1100. The number of carboxyl end groups was determined to be 149 per $10^6$ carbon atoms using the method described above.

Purification of Polymer Dispersions

To separate the polymers from the unreacted monomer $CF_2$=CF—O—$CF_2CF_2$—$SO_3Na$, aliquots of Polymer Dispersions A, B, C and D were individually anion-exchanged using a 600 mL column filled with 450 mL of anion exchange resin (available from Dow Chemical Company, Midland, Mich., under the trade designation "AMERLITE IRA 402 OH") at a rate of two bed volume per hour. After 3 hours this procedure was finished, and IR analysis showed that no free monomer $CF_2$=CF—O—$CF_2CF_2$—$SO_3Na$ was in the purified dispersions.

Polymer Dispersion C purified as above is denoted CP, and Polymer Dispersion D purified as above is denoted DP.

Conversion of Dispersions of Ionic Fluoropolymer-$SO_3Na$ Form to Fluoropolymer-$SO_3H$ Form Via Cation Exchange The anion-exchanged dispersions CP and DP were then each cation-exchanged using 500 g of each dispersion and 100 mL of cation exchange resin (available from Purolite, Bala Cynwyd, Pa., under the trade designation "PUROLITE C 150") in a 500 mL vessel at room temperature. After 24 hours the cation exchange was finished. After separation of the cation exchange resin the cation exchanged dispersions CP2 and DP2 resulted. Finally the dispersions CP2 and DP2 were concentrated in a rotary evaporator to give the corresponding polymers CP2S and DP2S in solid form.

Post-fluorination

Samples of the polymers CP2S and DP2S were placed in a 1000 mL autoclave, and the temperature was raised to 70° C. while the autoclave was deaerated under vacuum. Then a gaseous halogenating agent, 10% by mass $F_2$ gas in nitrogen gas was introduced, and the system was maintained in this state for 30 minutes. Then the gaseous halogenating agent was exhausted from the autoclave. This procedure was repeated eleven times.

Thereafter the system was cooled to room temperature, and the gaseous fluorinating agent was exhausted from the autoclave. After repeated flushing with nitrogen the reactor was opened and the fluoropolymers CP2SPF (PF=post-fluorinated) and DP2SPF were obtained.

As a result of IR measurements the spectra of the fluoropolymers CP2SPF and DP2SPF had no signals in the region of 1060 $cm^{-1}$ respectively no discernable $SO_3H$-groups. Additionally, a new peak at 1467 $cm^{-1}$ was observed. This implied that the $SO_3H$-groups were converted in $SO_2F$-groups by post-fluorination.

Various modifications and alterations of this disclosure may be made by those skilled in the art without departing from the scope and spirit of the disclosure, and it should be understood that this invention is not to be unduly limited to the illustrative embodiments set forth herein.

What is claimed is:

1. A method of making a copolymer, the method comprising copolymerizing components comprising tetrafluoroethylene and at least one compound represented by formula $CF_2$=CF—O—$(CF_2)_a$—$SO_2X$, wherein a is a number from 1 to 4, and X is —NZH, —NZ—$SO_2$—$(CF_2)_{1-6}$—$SO_2X'$, or —OZ, wherein Z is independently a hydrogen, an alkali metal cation or a quaternary ammonium cation, and X' is independently —NZH or —OZ, wherein the components comprise at least 60 mole % of tetrafluoroethylene based on the total amount of components, and wherein copolymerizing is carried out by aqueous emulsion polymerization at a pH of at least 9, wherein as polymerized, the copolymer has up to 400 —COOM and —COF end groups per $10^6$ carbon atoms, wherein M is independently an alkyl group, a hydrogen atom, a metallic cation, or a quaternary ammonium cation.

2. The method of claim 1, wherein the components further comprise perfluoroalkyl vinyl ether; perfluoroalkoxyalkyl vinyl ether; a fluorinated olefin represented by formula $C(R)_2$=CF—Rf, wherein Rf is fluorine or a perfluoroalkyl having from 1 to 8 carbon atoms and each R is independently hydrogen, fluorine, or chlorine; or a combination thereof.

3. The method of claim 1, wherein the components further comprise at least one of hexafluoropropylene, perfluoromethyl vinyl ether, perfluoropropyl vinyl ether, perfluoro-3-methoxy-n-propyl vinyl ether, tetrafluoropropene, or vinylidene fluoride.

4. The method of claim 1, wherein the copolymerizing is carried out in the absence of a fluorinated emulsifier.

5. The method of claim 1, wherein the copolymerizing is carried out without coagulating to isolate the copolymer as a solid.

6. The method of claim 1, wherein the copolymerizing is carried out without hydrolyzing the copolymer.

7. The method of claim 1, wherein copolymerizing is carried out in the presence of a bisulfite or sulfite salt to generate —$SO_2X$ end groups, wherein X is independently —NZH, —NZ—$SO_2$—$(CF_2)_{1-6}$—$SO_2X'$, or —OZ, wherein Z is independently a hydrogen, a metal cation or a quaternary ammonium cation, and wherein and X' is independently —NZH or —OZ.

8. The method of claim 1, wherein the copolymer has an —$SO_2X$ equivalent weight of up to 1000.

9. The method of claim 1, further comprising post-fluorinating the copolymer.

10. The method of claim 1, wherein the components further comprise at least one of ethylene, propylene, isobutylene, ethyl vinyl ether, vinyl benzoate, ethyl allyl ether, cyclohexyl allyl ether, norbornadiene, crotonic acid, an alkyl crotonate, acrylic acid, an alkyl acrylate, methacrylic acid, an alkyl methacrylate, or hydroxybutyl vinyl ether.

11. The method of claim 1, further comprising combining the copolymer with at least one of manganese cations, ruthenium cations, or cerium cations.

12. The method of claim 1, further comprising forming a membrane comprising the copolymer.

13. The method of claim 1, wherein X is —OZ.

14. The method of claim 1, wherein a is 2.

15. The method of claim 1, wherein the copolymer comprises anionic species that are not covalently bound to the copolymer, the method further comprising contacting the dispersion of the copolymer with an anion exchange resin having associated hydroxide ions, and exchanging at least a portion of the anionic species with the hydroxide ions to provide an anionic exchanged dispersion.

16. The method of claim 1, wherein the copolymer comprises cationic species that are not covalently bound to the copolymer, the method further comprising contacting the dispersion of the copolymer with a cation exchange resin having acidic protons, and exchanging at least a portion of the cationic species with the protons to provide cation-exchanged dispersion.

17. The method of claim 1, further comprising spray drying the copolymer.

* * * * *